Aug. 7, 1945.   L. BURGESS   2,380,937
NAVIGATION INSTRUMENT
Filed July 3, 1943   6 Sheets-Sheet 1

Louis Burgess INVENTOR
BY
ATTORNEY

Aug. 7, 1945.   L. BURGESS   2,380,937
NAVIGATION INSTRUMENT
Filed July 3, 1943   6 Sheets-Sheet 3

Aug. 7, 1945.　　　L. BURGESS　　　2,380,937
NAVIGATION INSTRUMENT
Filed July 3, 1943　　　6 Sheets-Sheet 4

INVENTOR
Louis Burgess
BY
W. Lee Helms
ATTORNEY

Patented Aug. 7, 1945

2,380,937

UNITED STATES PATENT OFFICE 2,380,937

NAVIGATION INSTRUMENT

Louis Burgess, Jersey City, N. J.

Application July 3, 1943, Serial No. 493,436

8 Claims. (Cl. 33—1)

This invention is a new and useful navigation instrument. The invention will be fully understood from the following description read in conjunction with the drawings in which.

Figure 1:
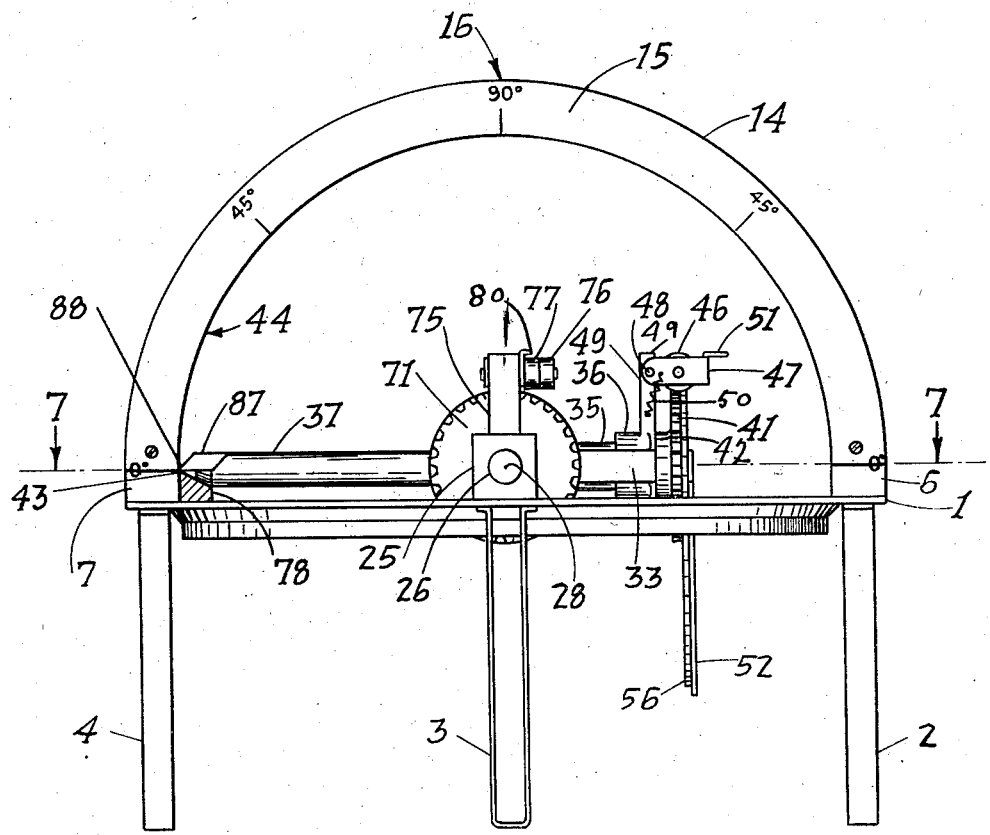
Fig. 1 is a side view of the instrument of my invention with one element in section.
Figure 2:
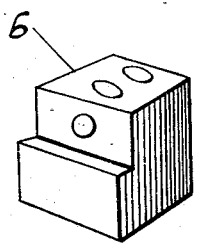
Fig. 2 is a perspective view of one element of the construction shown in Fig. 1.
Figure 3:
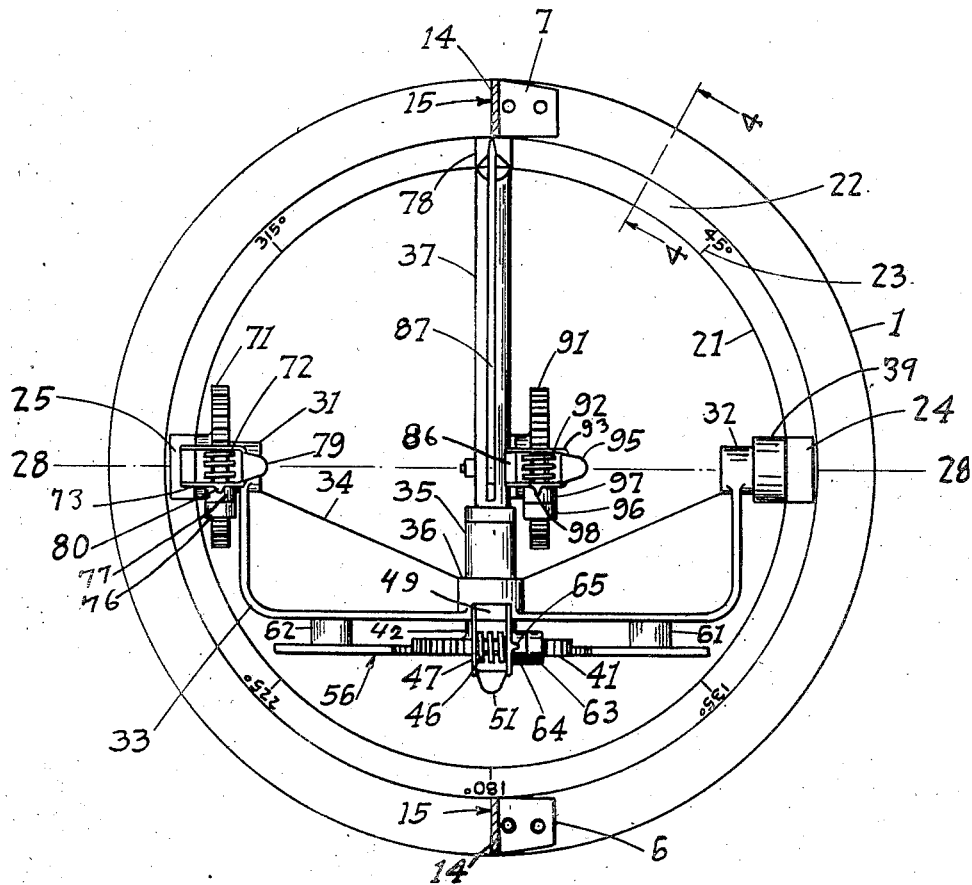
Fig. 3 is a top view of the construction shown in Fig. 1 with one element in section.
Figure 4:
Fig. 4 is a section through the construction shown in Fig. 3 on the plane indicated by 4—4.

Referring to the drawings, 1 is a ring supported by legs 2, 3, 4, and 5. The construction of the ring is evident from the radial section thereof in Fig. 4. The ring carries blocks 6 and 7 (Figs. 1, 2, 3 and 7) secured to the upper face thereof by screws anchored in ring 1 (Fig. 3). The construction of blocks 6 and 7 is evident from the perspective view of block 6 in Fig. 2. These blocks support arc 14 (Figs. 1 and 3). The arcuate face of this arc is scale 15 and is subdivided in some suitable way for purposes of reference. This scale is exactly above a diameter of ring 1 and defines a plane normal to that defined by the upper face of ring 1. The central point 16 of scale 15 is over the exact center of ring 1 as viewed from above, i. e., it lies on the normal to the plane defined by the upper surface of ring 1 drawn through the exact center of ring 1. The preferred method of marking scale 15 is to subdivide it into degrees of arc with the 90° marking at the point 16.

Ring 21 is within and concentric with ring 1. The construction of ring 21 is evident from the radial section in Fig. 4. Ring 21 may be freely turned within ring 1. The upper face 22 of ring 21 carries circular scale 23 and is subdivided in some suitable way for purposes of reference. The preferred method of marking scale 23 is to subdivide it into degrees of arc with its origin at one end of the diameter on which scale 15 is located (Fig. 3).

Ring 21 (Figs. 1, 3, 5, 6 and 7) carries pillow blocks 24 and 25 secured to upper face 22 of ring 21. These blocks are bored to form journals for shafts 26 and 27. These shafts are capable of a turning movement about the axis 28 with axis 28 parallel to upper face 22 of ring 21 and also parallel to the upper face of ring 1. The inside ends of shafts 26 and 27 are secured in hubs 31 and 32 (Figs. 3, 5, 6 and 7) formed integral with the bracket 33 provided with the web or stiffener 34. Tubular bushing 35 (Figs. 3 and 7) is seated in the boss 36 in bracket 33 and is bored to form a journal for one end of rod 37. This rod is held longitudinally in position within the journal 35 by collar 38 which is pinned or similarly secured to the rod and by worm gear 41, the hub 42 which is pinned or similarly secured to rod 37. The rod 37 and bracket 33 are centralized between blocks 24 and 25 by collar 39 and a worm gear hereinafter described.

Figure 7:
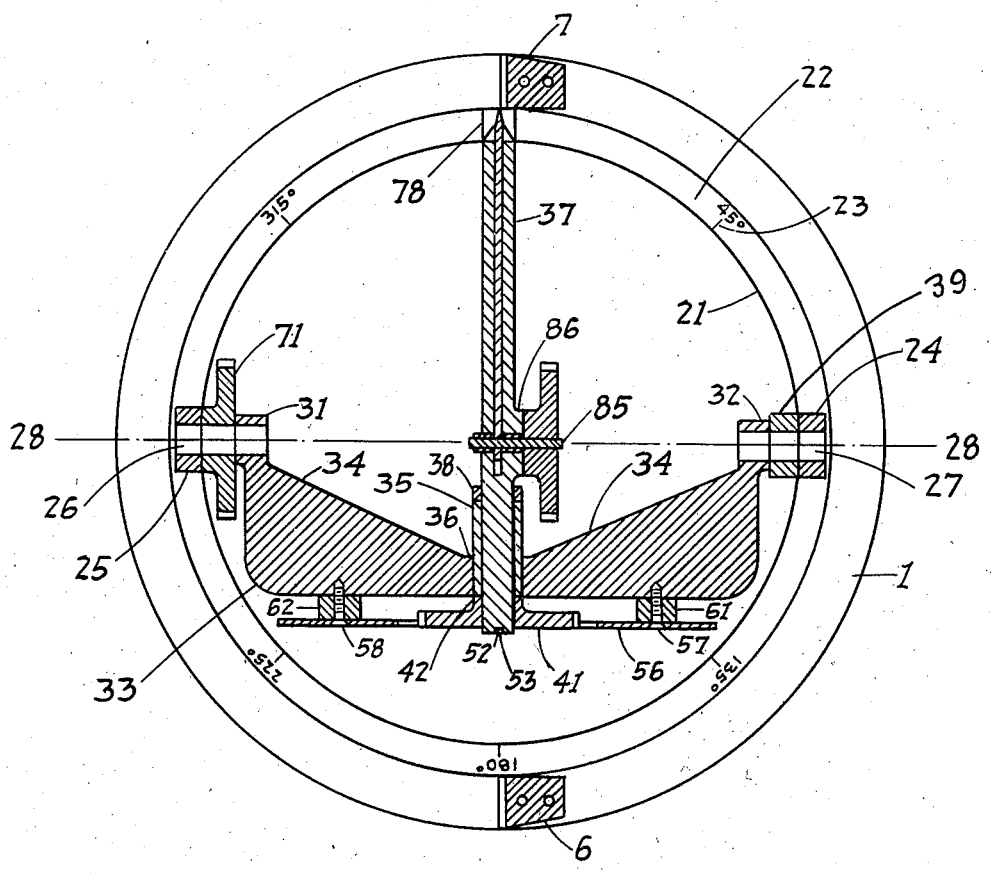
Fig. 7 is a horizontal section through the construction shown in Fig. 1 on the plane indicated by 7—7.
Figure 8:
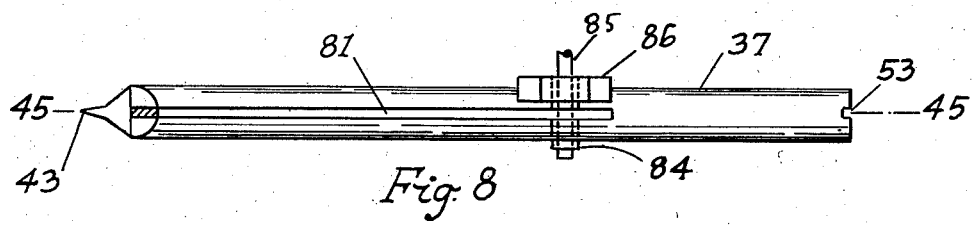
Fig. 8 is a top view of one element of the construction shown in Fig. 1.
Figure 9:
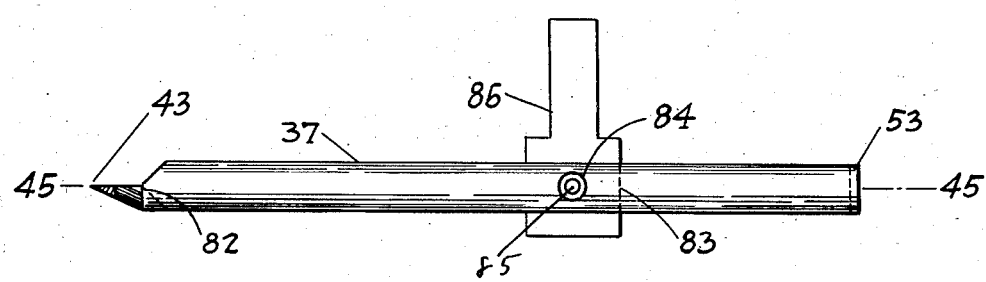
Fig. 9 is a side view of the element shown in Fig. 8.

The exact form of rod 37 is shown in Figs. 8 and 9. One end of rod 37 is reduced to point 43 which extends to within a few thousandths of an inch (Fig. 1) of the interior edge 44 of the scale 15 so that it may be freely moved in an arcuate path about the transverse axis 28 (Fig. 7) while its position in this path is measurable by reference to scale 15.

The longitudinal axis of rod 37 is indicated by line 45 (Figs. 8 and 9) and lies in the plane defined by the face of arc 14 which carries scale 15. It may be turned about this axis within journal 35. Fine movements may be accomplished by worm gear 41 (Figs. 1, 3 and 7) and worm 46 (Figs. 1 and 3) cooperating therewith. Worm 46 is held in the U 47 which is pivotally mounted by pin 48 on post 49 (Fig. 1). For coarse movements, worm 46 is disengaged from worm gear 41 by lifting handle 51. Worm 46 is normally held in firm engagement with the worm gear 41 by a suitable spring or springs (50) exerting tension downwardly on the U 47.

Pointer 52 (Fig. 5) is mounted in slot 53 in worm gear end of rod 37. This pointer carries hair or hair line 55 (Fig. 5) by means of which the extent of the turning of rod 37 about its longitudinal axis may be read on scale 56 secured by screws 57 and 58 to bracket 33 (Figs. 5 and 7) and spaced apart from the bracket by means of collars 61 and 62 (Fig. 7).

Worm 46 (Fig. 5) is turned by knob 63 and adjacent knob 63 is mounted drum 64 graduated in minutes or in relatively small multiples of a degree so that the exact position of pointer 52 within the limits of a particular degree may be read directly from drum 64 by reference to the pointer 65.

For this purpose worm gear 41 should have exactly 360 teeth where the degree system of measurement is employed. If some other system of measurement is used the number of teeth in worm gear 41 must correspond exactly to the number of units in the system of measurement used.

Figure 5:
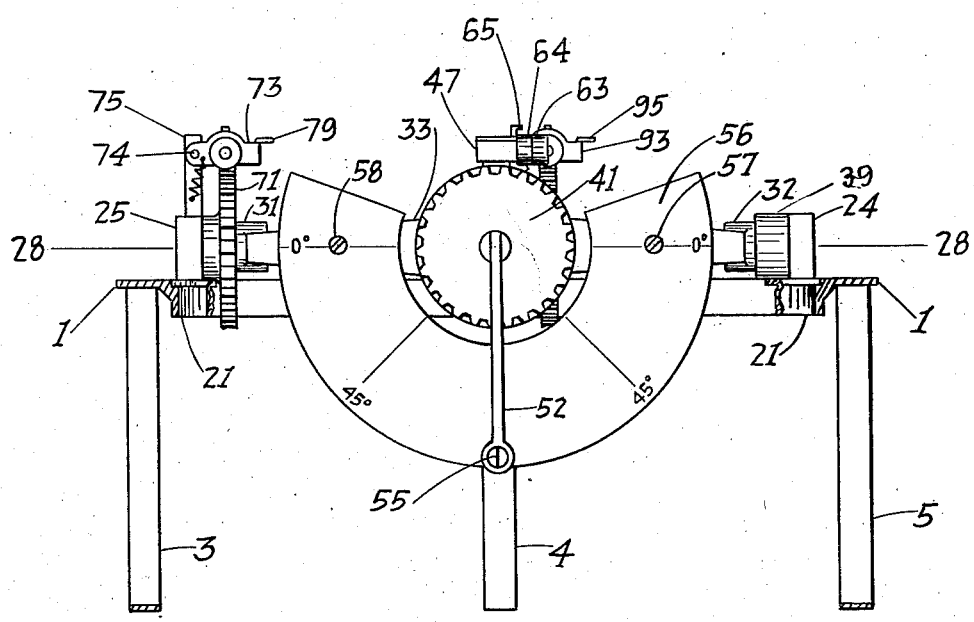
Fig. 5 is an end view of the construction shown in Fig. 1 with parts broken away to permit observation of the internal construction.
Figure 6:
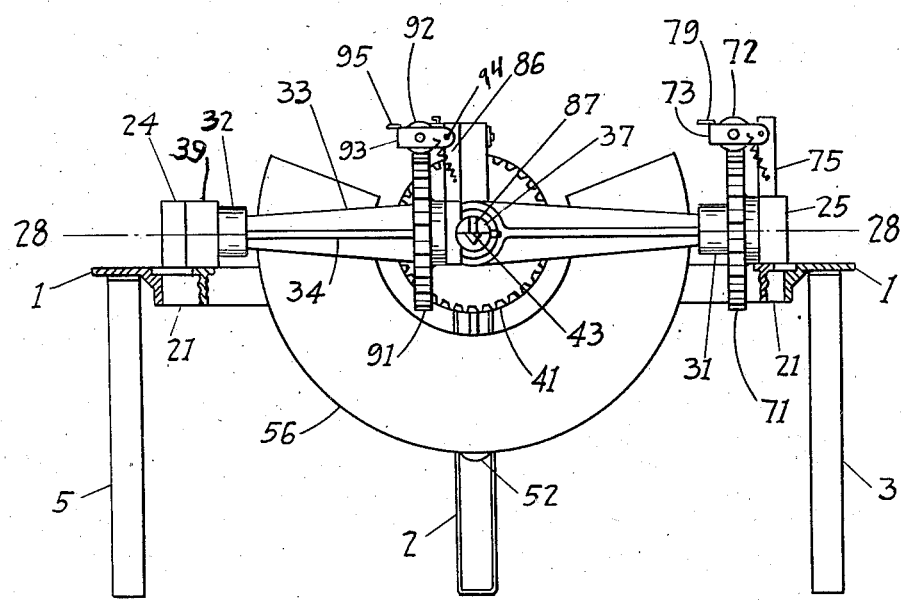
Fig. 6 is an end view of the other end of the construction shown in Fig. 1 with parts broken away to facilitate observation of the internal construction.

Longitudinal axis 45 of rod 37 crosses exactly transverse axis 28. Rod 37 may therefore be tilted about transverse axis 28 and be turned about longitudinal axis 45. The angular movement of bracket 33 and rod 37 about transverse axis 28 is controlled by worm gear 71 pinned to the shaft 26 (Figs. 5 and 7) and worm 72 cooperating therewith (Figs. 3 and 6). The worm 72 is carried (Fig. 5) in the U 73 pivotally secured by pin 74 to post 75 formed integrally with pillow blocks 25. For coarse movements worm 72 is disengaged from the worm gear 71 by lifting handle 79 (Figs. 3 and 5). When the handle is released the worm is urged into firm engagement with worm gear 71 by a suitable spring or springs (not shown) exerting pressure downwardly on U 73.

The tilting, i. e., the angular movement of longitudinal axis 45 of rod 37 about transverse axis 28 is measurable on vertical arcuate scale 15.

Worm 72 is controlled (Fig. 1) by the knob 76 and drum 77 connected thereto is divided into relatively small subdivisions of the unit employed. This drum is read by reference to pointer 80. If, for example, the scale 15 is subdivided into degrees worm gear 71 should have exactly 360 teeth while if some other unit of measurement is used, the number of teeth must correspond to the number of some relatively small unit of the system of measurement employed. Stop 78 is provided so that rod 37 may easily be brought to the position in which longitudinal axis 45 registers with the 0 point of scale 15.

Rod 37 is formed with longitudinal slot 81, the outlines of which, in the vertical plane, are indicated by dotted lines, 82 and 83 in Fig. 9. It is also provided with tranverse bushing 84 bored to form a journal for shaft 85 and secured to one side of the rod 37 there is an upstanding post 86.

Figure 10:
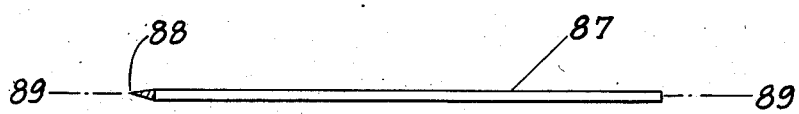
Fig. 10 is a top view of another element of the construction shown in Fig. 1.
Figure 11:
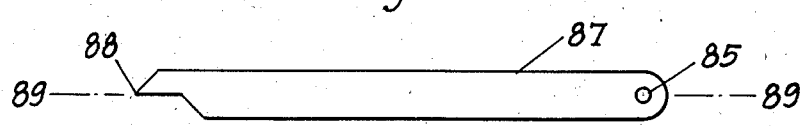
Fig. 11 is a side view of the element shown in Fig. 10.

The shaft 85 carries the rod or pointer 87 (Figs. 10 and 11) which is immobilized with respect to shaft 85 by means of a suitable pin (not shown). Rod 87 is formed with a point 88 (Figs. 10 and 11) and because of the form of the rod this point may be brought into substantially the identical position indicated by point 43 (Figs. 8 and 9). The longitudinal axis of rod 87 is indicated by line 89. The rod or pointer 87 may be turned about the transverse axis formed by the shaft 85 (Fig. 3) by worm gear 91 and worm 92 cooperating therewith. When pointer 52 is on the zero point of scale 56 the transverse axis of shaft 85 coincides with transverse axis 28. Worm 92 is carried in the U 93 pivotally secured (Fig. 6) by pin 94 to the post 86. For coarse movements of the pointer 87, worm 92 is disengaged from worm gear 91 by lifting handle 95 formed integrally with U 93. When handle 95 is released, the worm 92 is held in engagement with worm gear 91 by a suitable spring or springs (not shown), which exert pressure downwardly on U 93.

Fine adjustments of the rod or pointer 87 are obtained (Fig. 3) by turning knob 96. Drum 97 is connected thereto and is graduated in relatively small subdivisions of the unit of measurement employed and is read by reference to pointer 98. For example, if that unit is a degree drum 97 will be graduated into minutes or in relatively small fractions of a degree so that the exact position of the rod 87 may be accurately determined.

Movement of the longitudinal axis 89 in degrees or simple fractions of a degree may be read on the scale 15 with longitudinal axis 45 of rod 37 in zero position while finer movements are read from drum 97 by reference to pointer 98.

Figure 12:
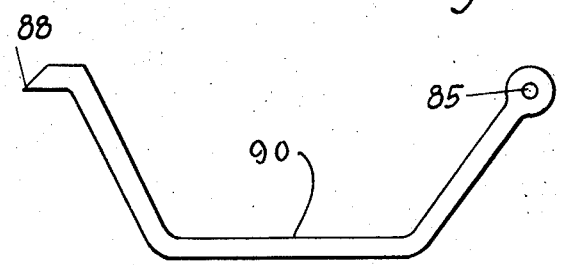
Fig. 12 is a side view of an alternative form of the element shown in Figs. 10 and 11.

The rod or pointer 90 (Fig. 12) may be used in place of the rod or pointer 87 (Figs. 10 and 11) and has the advantage that it may be used over a slightly greater range by avoiding interference with gear 41, U 47 and post 48.

The mode of operation of the instrument is as follows:

Assuming, for example, that a navigator has completed a sight and that the sextant altitude so obtained has been corrected to the corrected sextant altitude, (Ho) and the navigator has obtained the declination and right ascension of the body sighted by reference to the Nautical Almanac and knows, therefore, the hour angle (H. A.) between the body and his dead reckoning (D. R.) position then with longitudinal axis 45 of rod 37 at zero position on scale 15 as indicated in Fig. 1 and regarding the longitudinal axis 45 as the celestial pole, the handle 95 is lifted to disengage worm 92 from worm gear 91 and longitudinal axis 89 is brought to the approximate angular relationship with longitudinal axis 45 which the declination of the body bears to the elevated celestial pole. As stated movements of a degree or simple fractions of a degree are measurable on scale 15 with rod 37 in zero position while finer movements are measurable on drum 97 by reference to pointer 98. For this purpose, the rod or pointer 87 is regarded as having the longitudinal axis indicated by the line 89 in Figs. 10 and 11. Thus, for example assuming a D. R. position in a north latitude if the body has a declination of 20°+, the pointer 88 will be brought upwardly on the arcuate scale 15 to the scale reading of 70°, whereas, if the body sighted has a declination of 20°— the pointer 88 will be brought upwardly on the arcuate scale 15 to the 90° mark at the top center of the scale and 20° beyond in the direction of the other end of the arcuate scale.

When the rod or pointer 87 has been set in this way so that its longitudinal axis 89 bears the exact angular relationship to the longitudinal axis 49 or rod 37 that the declination of the body bears to the elevated celestial pole and leaving these two fixed in this relative adjustment, rod 37 is then lifted to bring its longitudinal axis 45 upwardly to the point on the arcuate scale 15 corresponding to the dead reckoning latitude (D. R. lat.). Rough movements of rod 37 are made by merely lifting handle 79 and turning worm gear 71 by hand while finer and more accurate adjustments are made by releasing the handle 76 so that the worm 72 reengages the worm gear 71 and completing the final adjustment by means of knob 76 reading the exact position of the longitudinal axis 45 on the drum 77, by reference to pointer 80.

The next step is to turn the rod 37 about its longitudinal axis 45 to an extent equal to the hour angle (H. A.) of the body sighted with reference to the ship. This adjustment is determined by the arcuate scale 56 (Fig. 5) and by moving line 55 carried by the pointer 52 to the exact setting required. Coarse adjustments are made by lifting handle 51 to disengage worm 46 from worm gear 41 and turning the worm 41 by hand while finer adjustments are made by releasing the handle 51 to permit worm 46 to reengage worm gear 41 and turning knob 63 while reading the exact adjustment on drum 64 by reference to pointer 65.

If desired, scale 56 may be graduated either alternatively or additionally in hours, minutes and seconds of arc, although for practical purposes it is recommended that these units be converted into degrees of arc and that the unit of angular measurement for all adjustments of the instrument be identical.

This final adjustment moves the pointer 87 out of the vertical plane defined by the scale face of arc 14 in which the longitudinal axis 45 of pointer 37 is located and brings it out of registration with scale 15. At this point, the inner ring 21 is simply moved within the outer ring 1 to bring the point 88 of rod 87 into registration with the arcuate scale 15, whereupon the computed altitude (Hc) may be read directly from scale 15. By following the arcuate scale 15 down to the point where it intersects arcuate scale 23 carried by the upper face of the ring 21 the computed azimuth of the celestial body may be read directly from the scale 23.

In this way without the use of logarithms or haversines and without resort to a calculation the navigator may obtain directly the computed altitude and azimuth of the body sighted.

There are various other uses for the navigation instrument hereinabove described.

Thus, for example, if the navigator wishes to determine the true course (Cn) corresponding to the great circle course to a particular destination, the rod or pointer 87 is then set to the declination of the destination, rod 37 is then set to the latitude of the ship and the pointer 52 is then set to the difference in longitude between the ship and its point of destination. By moving the ring 21 within the ring 1 to bring the point 88 of the pointer 87 into registry with the arcuate scale 15 and by following this face down to the point where it intersects the scale 23 the course may be read directly from scale 23.

A similar procedure is followed where it is desired to correct the compass by means of azimuths and where it is necessary for this purpose to determine the exact azimuth of the sun at a particular time or series of times. In this case the rod or pointer 87 is first set to the declination of the sun at the instant of observation. The rod 37 is then set to the latitude of the ship, the pointer 52 is then set to the hour angle of the sun with reference to the ship at the time of observation. By moving the ring 21 within the ring 1 to bring the scale 15 into registry with the point 88 and by following the scale 15 down to the point where it intersects the scale 23, the azimuth of the sun at the time of observation may be read directly from scale 23.

As is evident from the foregoing, the upper surface of the rings 1 and 21 define a reference plane which may be used as a base in determining the relative positions of the point 88 when the various adjustments of the instrument have been made. For convenience of construction it is desirable to mount the shafts 26 and 27 above the upper surface of the rings 1 and 21 and for this reason the preferred reference plane is a plane parallel and in turn defined by the one just mentioned, passing through the zero points of the arcuate scale 15 and including the transverse axis 28 (Fig. 7). This plane also includes longitudinal axis 45 of rod 37 and longitudinal axis 89 of rod 87 when these rods are in the positions indicated in Fig. 1, i. e., directed to the zero point of scale 15. This plane also includes the axis of the shaft 85 when the pointer 52 is set to zero hour angle. Both reference planes are normal to the plane defined by the scale face of arc 14 which plane is the locus of all positions of the longitudinal axis 45 and is also the locus of all positions of the longitudinal axis 89 when the hour angle adjustment is zero. The point of intersection of the transverse axis 28 with the longitudinal axes 45 and 89 marks the exact center of the instrument. This point is on the normal to the plane defined by the upper face of rings 1 and 21 erected on the exact center of these rings and is concentric with arcuate scale 15. The central point of scale 15 is located on the same normal.

The foregoing specific description is for purposes of illustration and not of limitation and it is my intention that the invention be limited only by the appended claims or their equivalents wherein I have endeavored to claim broadly all inherent novelty.

I claim:

1. A navigation instrument for solving spherical triangles comprising a first rod having a longitudinal axis, means for tilting said first rod within a plane about a first transverse axis crossing said longitudinal axis and normal to said plane, means for measuring the angle of tilting, means for turning said first rod about its longitudinal axis, means for measuring the angle of turning with respect to said plane, a second rod carried by said first rod, having a longitudinal axis, means for tilting said second rod about a second transverse axis, crossing both said longitudinal axes and coincident with the said first transverse axis when the angle of turning is 0, means for measuring the angle included between the said longitudinal axes, means defining a reference plane and means for measuring the position of a predetermined point on said second rod with reference to said reference plane.

2. An instrument according to claim 1 in which the last mentioned means for measuring is an arc altitude scale concentric with the point of intersection of said transverse and longitudinal axes and normal to said reference plane having its central point on the normal to said reference plane drawn through the intersection of the said transverse and longitudinal axes.

3. A navigation instrument for solving spherical triangles comprising a first rod having a longitudinal axis, a journal embracing one end of said first rod, a bracket carrying said journal, said bracket being in turn journalled for angular movement about a first transverse axis, crossing said longitudinal axis and normal thereto, means for measuring the angular movement of said first rod about said first transverse axis, means for measuring the angle of turning of said first rod in said journal, a second rod having a longitudinal axis carried by said first rod, means for tilting said second rod about a second transverse axis, crossing both said longitudinal axes and coincident with the said first transverse axis when the angle of turning of said first rod in said journal is 0, means for measuring the angle included between the said longitudinal axes, means defining a reference plane and means for measuring the position of a predetermined point on said second rod with reference to said reference plane.

4. An instrument according to claim 3 in which the last mentioned means for measuring is an arc altitude scale concentric with the point of intersection of said transverse and longitudinal axes and normal to said reference plane having its central point on the normal to said reference plane drawn through the intersection of the said transverse and longitudinal axes.

5. A navigation instrument for solving spherical triangles comprising a first rod having a longitudinal axis, a journal embracing one end of said first rod, a bracket carrying said journal, said bracket being in turn journalled for angular movement about a first transverse axis crossing the said longitudinal axis and normal thereto, means for measuring the angular movement of said first rod about said transverse axis, a first ring carrying the said bracket, a line normal to said first ring erected upon the center thereof passing through the intersection of the said longitudinal axis with said first transverse axis, said ring defining a reference plane, means for measuring the angle of turning of said first rod in said journal, a second rod having a longitudinal axis carried by said first rod, means for tilting said second rod about a second transverse axis, crossing both said longitudinal axes and coincident with the said first transverse axis when the angle of turning of said first rod in said journal is 0, means for measuring the angle included between the said longitudinal axes, a second ring surrounding and concentric with said first ring, an arc altitude scale concentric with the point of intersection of said transverse and longitudinal axes and normal to said reference plane, carried by said second ring having its central point on the normal to said reference plane drawn through the intersection of the said transverse and longitudinal axes.

6. An instrument according to claim 5 in which said first ring carries a circular scale in said reference plane having its point of origin on the intersection of said first longitudinal axis with said reference plane.

7. A navigation instrument for solving spherical triangles comprising a first rod having a longitudinal axis, means for tilting said first rod within a plane about a first transverse axis crossing said longitudinal axis and normal to said plane, means for measuring the angle of tilting, means for turning said first rod about its longitudinal axis, means for measuring the angle of turning with respect to said plane, a second rod carried by said first rod, having a longitudinal axis, means for tilting said second rod about a second transverse axis, crossing both said longitudinal axes and coincident with the said first transverse axis when the angle of turning is 0, means for measuring the angle included between the said longitudinal axes and an arc altitude scale concentric with the point of intersection of said transverse longitudinal axes and having its central point on a normal to said first transverse axis.

8. A navigation instrument for solving spherical triangles comprising a first rod having a longitudinal axis, a journal embracing one end of said first rod, a bracket carrying said journal, said bracket being in turn journalled for angular movement about a first transverse axis, crossing said longitudinal axis and normal thereto, means for measuring the angular movement of said first rod about said first transverse axis, means for measuring the angle of turning of said first rod in said journal, a second rod having a longitudinal axis carried by said first rod, means for tilting said second rod about a second transverse axis, crossing both said longitudinal axes and coincident with the said first transverse axis when the angle of turning of said first rod in said journal is 0, means for measuring the angle included between the said longitudinal axes, and an arc altitude scale concentric with the point of intersection of said transverse and longitudinal axes and having its central point on a normal to said first transverse axis.

LOUIS BURGESS.